United States Patent [19]

Matsuzawa et al.

[11] Patent Number: 5,177,654
[45] Date of Patent: Jan. 5, 1993

[54] CORE SLIDER FOR RIGID MAGNETIC DISC DRIVE

[75] Inventors: Soichiro Matsuzawa, Kuwana; Nobuhiro Terada, Kasugai; Hiroaki Yui, Kohnan, all of Japan

[73] Assignee: NGK Insulators, Ltd., Japan

[21] Appl. No.: 672,111

[22] Filed: Mar. 19, 1991

[30] Foreign Application Priority Data

Mar. 23, 1990 [JP] Japan .................................. 2-74371

[51] Int. Cl.⁵ .......................... G11B 5/187; G11B 5/60
[52] U.S. Cl. .................................................... 360/103
[58] Field of Search ........................... 360/103; 29/603

[56] References Cited

U.S. PATENT DOCUMENTS 4,327,387  4/1982  Plotto ................................. 360/103
4,740,853  4/1988  Mukae et al. ...................... 360/103
4,870,521  9/1989  Okabayashi ....................... 360/103

Primary Examiner—Robert S. Tupper
Attorney, Agent, or Firm—Parkhurst, Wendel & Rossi

[57] ABSTRACT

A core slider for a rigid magnetic disk drive, including a slider body having air bearing portions, and a core chip which has a magnetic gap for writing and reading information and which is integrally secured to the slider body. The slider body consists of a ferrite section which includes at least the air bearing portions and which is formed of Mn-Zn ferrite, and a non-magnetic ceramic section formed of a non-magnetic ceramic material. The core chip is accommodated in a groove formed in the slider body and bonded to the slider body by a glass material.

7 Claims, 7 Drawing Sheets

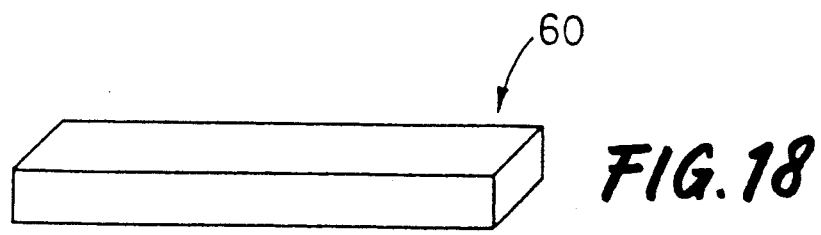
FIG. 18
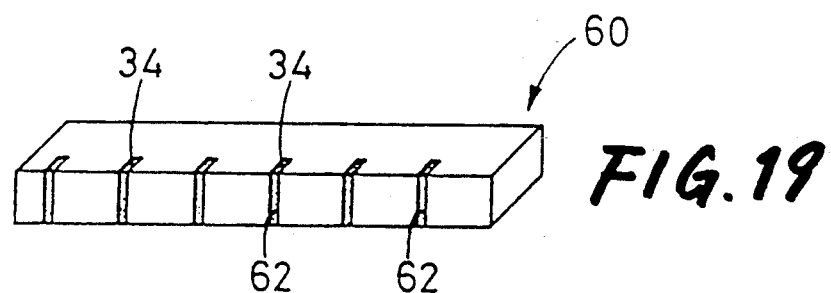
FIG. 19
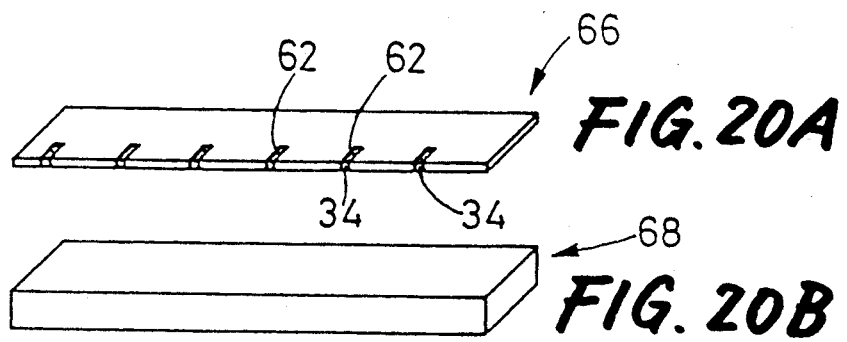
FIG. 20A
FIG. 20B
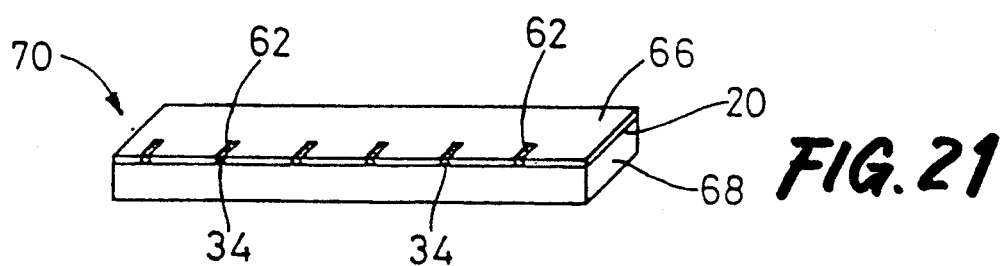
FIG. 21

CORE SLIDER FOR RIGID MAGNETIC DISC DRIVE

BACKGROUND OF THE INVENTION

1. Field of the Invention

The present invention relates to a core slider for a rigid magnetic disk drive consisting of a slider body having air bearing portions, and a core chip which has an information writing/reading magnetic gap and which is integrally bonded to the slider body. The invention also relates to a method of producing such a core slider.

2. Discussion of the Prior Art

A so-called composite type core slider is known as an air-bearing or flying type core slider for a rigid disk drive. The composite type core slider consists of a slider body having air bearing portions, and a core chip having a magnetic gap for writing or reading information on or from a magnetic memory disk. The slider body and the core chip are prepared as separate members, and are integrally bonded together. As compared with a monolithic type core slider, this composite type core slider has a smaller core thickness and accordingly lower inductance, and exhibits better high-frequency operating characteristics. The composite type core slider has an additional advantage that crosstalk can be reduced by forming the track portion such that the side faces of the track portion are substantially perpendicular or normal to the sliding surface on which a magnetic disk slides in operation.

On the other hand, the composite type core slider suffers from easy cracking of the bonding glass and easy distortion, if the slider body and the core chip have a difference in the coefficient of thermal expansion. In this respect, it is necessary to minimize the difference in the thermal expansion coefficient of the slider body and core chip. If the slider body and the core chip are formed of a same material, however, there is an undesirable tendency that a magnetic flux leaks from the core chip toward the slider body, causing the inferior information writing/reading efficiency.

To avoid deterioration of the magnetic properties of the known composite type core slider due to the magnetic flux leakage, the slider body is generally formed principally of a non-magnetic ceramic material such as $CaTiO_3$, whose coefficient of thermal expansion is almost equal to that of the ferrite of the core chip.

The conventional core slider whose slider body is formed of a non-magnetic ceramic material, particularly, the widely used core slider whose major component is $CaTiO_3$ has a high coefficient of friction with respect to the magnetic disk, and therefore has a high tendency of damaging the magnetic disk due to the frictional contact, whereby the slider body is likely to be damaged.

SUMMARY OF THE INVENTION

It is therefore a first object of the present invention to provide a composite type core slider for a rigid magnetic disk drive, which core slider has considerably improved durability, being adapted to effectively minimize the sliding friction with a magnetic disk while preventing deterioration of its magnetic efficiency.

A second object of the invention is to provide a method suitable for producing such a composite type core slider.

The above first object may be achieved according to one aspect of the present invention, which provides a core slider for a rigid magnetic disk drive, including a slider body having air bearing portions, and a core chip which has a magnetic gap for writing and reading information and which is integrally secured to the slider body, wherein the slider body consists of a ferrite section which includes at least the air bearing portions and which is formed of Mn-Zn ferrite, and a non-magnetic ceramic section formed of a non-magnetic ceramic material. The slider body has a chip-accommodating groove, and the core chip is accommodated in the chip-accommodating groove and glass-bonded to the slider body.

In the core slider of the present invention constructed as described above, the air bearing portions of the slider body are formed of Mn-Zn ferrite having a relatively small friction coefficient, whereby a magnetic disk can smoothly slide on the air bearing portions during operation of the core slider. Further, the present core slider may be adapted such that the Mn-Zn ferrite section consists of only those air bearing portions, or is limited to a part of the slider body which includes the air bearing portions and the neighboring portions on the side of the magnetic disk. This arrangement assures the smooth sliding of the magnetic disk on the Mn-Zn air bearing portions, without significantly sacrificing the magnetic efficiency of the core slider.

The non-magnetic ceramic section which cooperates with the Mn-Zn ferrite section to constitute the slider body may preferably include $CaTiO_3$ as a major component thereof.

The second object indicated above may be achieved according to another aspect of the present invention, which provides a method of producing a core slider for a rigid magnetic disk drive, the core slider including a slider body having air bearing portions, and a core chip which has a magnetic gap for writing and reading information and which is integrally secured to the slider body, the method comprising the steps of: (a) preparing a slider body blank by glass-bonding together a Mn-Zn ferrite sheet and a non-magnetic ceramic sheet, so as to give the slider body; (b) preparing the core chip having the magnetic gap; (c) forming a chip-accommodating groove for accommodating the core chip; (d) inserting the core chip in the chip-accommodating groove and glass-bonding the core chip to the slider body blank; and (e) forming the air bearing portions on the slider body blank such that the air bearing portions are provided by the Mn-Zn ferrite sheet, to thereby provide the slider body.

The air bearing portions may be formed by etching the Mn-Zn ferrite sheet of the slider body blank, or by machining the Mn-Zn ferrite sheet of the slider body blank.

The core chip may be inserted in the chip-accommodating groove and glass-bonded to the slider body blank, after the air bearing portions are formed on the slider body blank. In this case, the air bearing portions and a surface of the core chip in which the magnetic gap is open are ground, after the core chip is glass-bonded to the slider body blank.

Alternatively, the core chip may be inserted in the chip-accommodating groove and glass-bonded to the slider body blank, before the air bearing portions are formed on the slider body blank. The Mn-Zn ferrite sheet and a surface of the core chip in which the magnetic gap is open are ground, after the core chip is glass-bonded to the slider body blank and before the air-bearing portions are formed.

It is usually desirable to form a coil-winding groove in the slider body blank which permits a coil to be wound on the core chip accommodated in the chip-accommodating groove.

The core chip may be glass-bonded to the slider body blank by filling a clearance between the core chip and the chip-accommodating groove, with a bonding glass. Alternatively, a glass-filler groove is first formed in the slider body blank and filling the glass-filler groove with a mass of bonding glass, before the chip-accommodating groove is formed by removing a portion of the mass of bonding glass. The core chip is then glass-bonded to the slider body with the remaining portion of the mass of bonding glass.

BRIEF DESCRIPTION OF THE DRAWINGS

The above and optional objects, features and advantages of the present invention will become more apparent by reading the following detailed description of some presently preferred embodiments of the present invention, when considered in connection with the accompanying drawings, in which:

FIG. 18 is a perspective view of a ferrite block to provide ferrite sheets each used for producing a core slider according to a further embodiment of the present invention;

FIG. 19 is a perspective view showing the ferrite block with glass-filler grooves filled with a low-melting-point glass;

FIG. 20(a) is a perspective view of a ferrite sheet obtained by slicing the ferrite block of FIG. 19;

FIG. 20(b) is a perspective view of a ceramic sheet prepared independently of the ferrite sheet;

FIG. 21 is a perspective view of a slider body blank prepared by bonding together the ferrite and ceramic sheets of FIGS. 20(a) and 20(b) by a high-melting-point glass;

DETAILED DESCRIPTION OF THE PREFERRED EMBODIMENTS

Figure 1A:
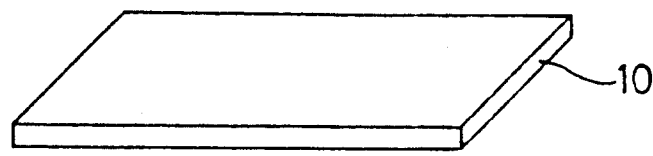
FIGS. 1(a) and 1(b) are perspective views respectively showing ferrite and ceramic sheets used to produce a core slider by a method according to one embodiment of this invention.

Reference is first made to FIGS. 1–12 which illustrate the process steps for producing a core slider according to one embodiment of this invention. The core slider to be produced is indicated generally by 13 in FIG. 13. For producing the core slider of FIG. 13, there is prepared a generally elongate rectangular ferrite sheet 10 which consists of a single crystal of Mn-Zn ferrite, as shown in FIG. 1(a). There is also prepared a ceramic sheet 12 which has the same surface area and shape as the Mn-Zn ferrite sheet 10 and which is formed of a non-magnetic ceramic material. One of the opposite major surfaces of each of these ferrite and ceramic sheets 10, 12 is mirror-polished in a suitable known manner.

In the present embodiment, the ferrite and ceramic sheets 10, 12 have a width slightly larger than two times the length of the core slider 13 (FIG. 13) in the direction parallel to air bearing portions 18 (which will be described), so that there are obtained two slider body blanks 16 (FIG. 3) each having a width slightly larger than the length of the core slider 13. However, the width of the ferrite and ceramic sheets 10, 12 may be slightly larger than the length of the core slider 13.

The thicknesses of the ferrite and ceramic sheets 10, 12 are larger by suitable amounts than the respective thicknesses of ferrite and ceramic layers (ferrite and ceramic sections) 30, 32 of a slider body 14 (FIG. 13) of the core slider 13. In the present embodiment, the air bearing portions 18 are constituted by the ferrite layers 30, as is apparent from the following description.

The non-magnetic ceramic material of the ceramic sheet 12 is a ceramic material whose coefficient of thermal expansion is close to that of a ferrite material. In particular, it is desirable that the ceramic sheet 12 consists principally of $CaTiO_3$, or $CaTiO_3$ and a small amount of additives. While the air bearing portions 18 are formed by etching the ferrite sheet 10, it is preferred to orient the ferrite sheet 10 such that one of the crystal planes (100), (110), (311), (332), (611), (331) and (211) of the Mn-Zn single crystal is selected for the surface to be etched to provide the air bearing portions 18.

Figure 1B:
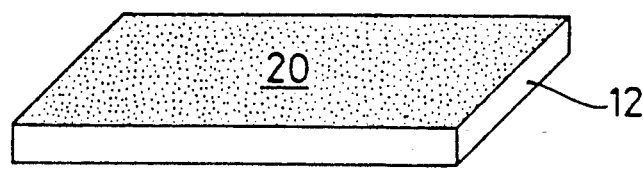
Figure 2:
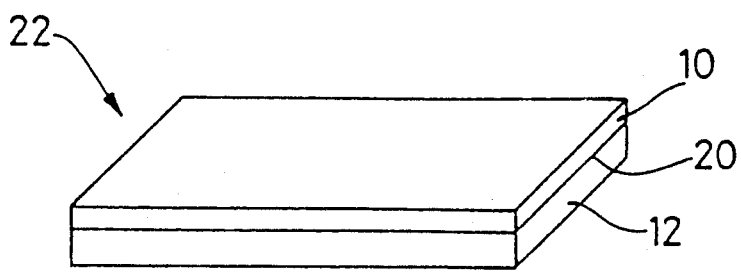
FIG. 2 is a perspective view of a clad plate prepared by bonding together the ferrite and ceramic sheets of FIGS. 1(a) and 1(b) with a high-melting-point glass.

Subsequently, a glass layer 20 having a thickness of about 0.05-20 μm is formed, as shown in FIG. 1(b), on at least one of the mirror-polished surfaces of these ferrite and ceramic sheets 10, 12, by applying a glass material having a high melting point by a suitable method such as sputtering or other film-forming process, or coating process using a glass paste. The ferrite and ceramic sheets 10, 12 are then butted together at the mirror-polished surfaces with the glass layer 20 interposed therebetween, and bonded together under pressure and heat. Thus, a clad plate 22 consisting of the ferrite and ceramic sheets 10, 12 bonded together with the glass layer 20 is prepared as shown in FIG. 2.

The glass material for the glass layer 20 has generally a softening point of about 600° C. or higher. For instance, the glass layer 20 has a glass composition which has a softening point of 670° C. and which consists of 50% by weight of $SiO_2$, 7% by weight of $B_2O_3$, 7% by weight of $Al_2O_3$, 5% by weight of $K_2O$, 12% by weight of ZnO, 12% by weight of $Na_2O$, 5% by weight of CaO and 2% by weight of BaO. In bonding the two sheets 10, 12, the glass layer 20 is heated to a temperature higher than its softening temperature, for example, about 720° C.

Figure 3:
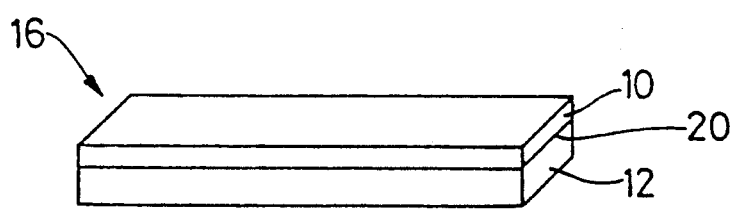
FIG. 3 is a perspective view of a slider body blank obtained by cutting the clad plate of FIG. 2.
Figure 4:
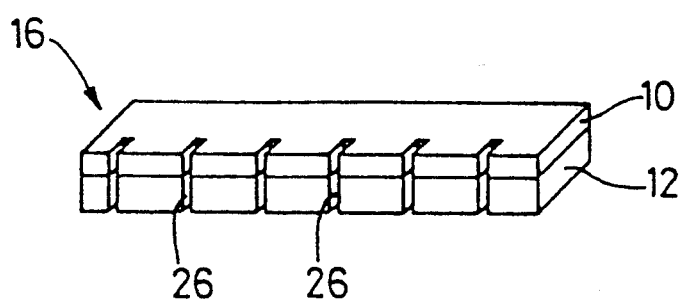
FIG. 4 is a perspective view showing the slider body blank after chip-accommodating grooves are formed therein.
Figure 5:
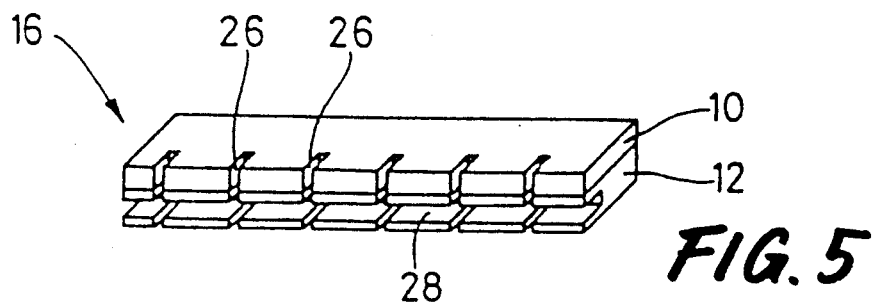
FIG. 5 is a perspective view of the slider body blank after coil-winding grooves are further formed therein.
Figure 8A:
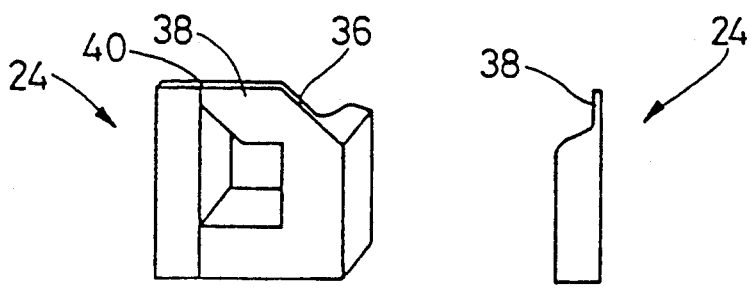
FIG. 8(a) is a perspective view of one of the core chips.
Figure 8B:
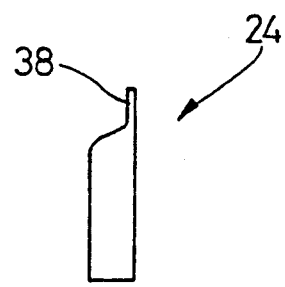
FIG. 8(b) is a left-hand side elevational view of the core chip of FIG. 8(a)
Figure 13:
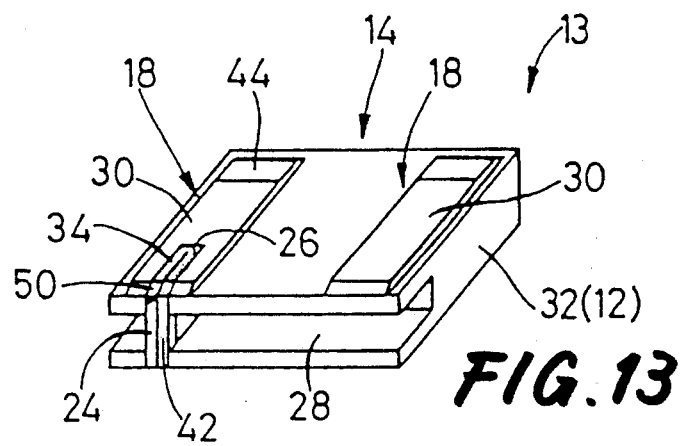
FIG. 13 is a perspective view of a core slider produced by the method illustrated in FIGS. 1 through 12.

The clad plate 22 consisting of the ferrite and ceramic sheets 10, 12 bonded together with the interposed glass layer 20 is cut along a widthwise centerline thereof, to provide two slider body blanks 16 as shown in FIG. 3. Each slider body blank 16 has a width slightly larger than the length of the core slider 13 (FIG. 13) to be eventually produced. In the next step, chip-accommodating grooves 26 are formed in one of the opposite side faces of the slider body blank 16, which side faces define the width of the blank 16, as illustrated in FIG. 4. These grooves 26 are provided to accommodate core chips 24 as shown in FIGS. 8(a) and 8(b). The grooves 26 are spaced apart from each other in the direction of length of the blank 16, with a spacing distance slightly larger than the width of the core slider 13 (which has one groove 26 and one core chip 24 as indicated in FIG. 13). Successively, a coil-winding groove 28 is formed in the same side face of the slider body blank 16, more precisely, in the ceramic sheet 12, such that the groove 28 extends in the longitudinal direction of the blank 16, while intersecting the chip-accommodating grooves 24, as shown in FIG. 5. This groove 28 permits a coil to be wound on the core chip 24 which is fixed in the corresponding groove 26, as described below.

Figure 6:
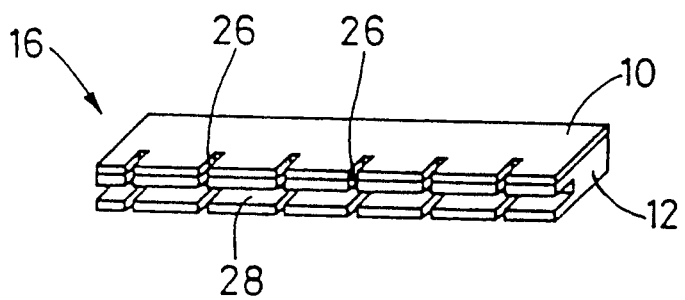
FIG. 6 is a perspective view of the slider body blank after the opposite major surfaces are ground.

After the grooves 26, 28 are formed in the slider body blank 16, the exposed opposite major surfaces of the ferrite and ceramic sheets 10, 12 of the blank 16 are ground such that the thickness of the ferrite sheet 10 is slightly larger than that of the ferrite layers 30 on the slider body 14 of the core slider 13, while the thickness of the ceramic sheet 12 is equal to that of the ceramic layer 32 of the slider body 14. The slider body blank 16 as ground is shown in FIG. 6. After the slider body blank 16 is ground, the separately prepared core chips 24 as shown in FIGS. 8(a) and 8(b) are inserted in the respective chip-accommodating grooves 26 in the blank 16, and are integrally bonded to the blank 16 with a mass of a bonding glass 34 which has a relatively low melting point.

Figure 7:
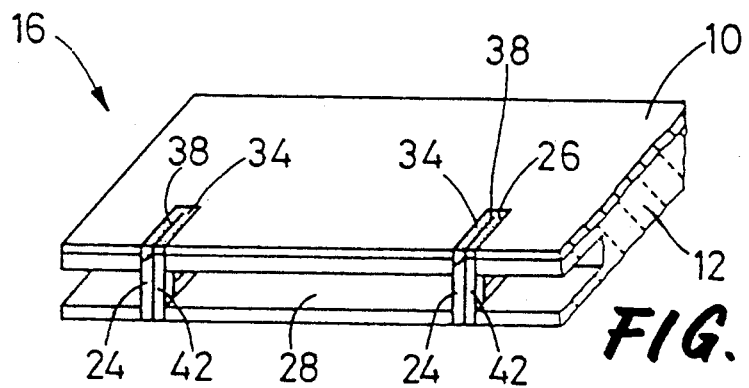
FIG. 7 is a fragmentary perspective view of the slider body blank after core chips are secured in the chip-accommodating grooves.

Each core chip 24 is a generally rectangular body having a center cavity, as shown in FIGS. 8(a) and 8(b). The core chip has a narrow portion 38 which defines a top one of the four sides of the rectangular body and which provides a track portion of the core slider 13. The narrow portion 38 includes an inclined rear part 36, and has a magnetic gap 40 formed in an intermediate part. The magnetic gap 40 is adapted to write and read information on or from a magnetic disk. As shown in FIG. 7, the core chip 24 is positioned together with a non-magnetic spacer 42, within the appropriate chip-accommodating groove 26 in the slider body blank 16, such that the inclined rear part 36 is located on the inner side of the groove 26 and such that the narrow portion 38 is exposed in the ground surface of the ferrite sheet 10. A clearance between the narrow portion 38 of the core chip 24 and the inner surface of the groove 16 is filled with a molten mass of the bonding glass mass 34, whereby the core chip 24 is integrally bonded to the slider body blank 16.

The bonding glass 34 has a low softening point than the high-melting-point glass of the glass layer 20, permitting the bonding of the core chip 24 to the blank 16 at a temperature lower than that at which the ferrite and ceramic sheets 10, 12 are bonded together by the glass layer 20. The softening point of the bonding glass 34 is generally not higher than about 450°. For example, the bonding glass 34 has a glass composition which has a softening point of 425° C. and which consists of 18.5% by weight of $SiO_2$, 4.0% by weight of $Al_2O_3$, 62.0% by weight of PbO, 10.0% by weight of $Bi_2O_3$, 3.5% by weight of $Na_2O$, and 2.0% by weight of $B_2O_3$.

Figure 9:
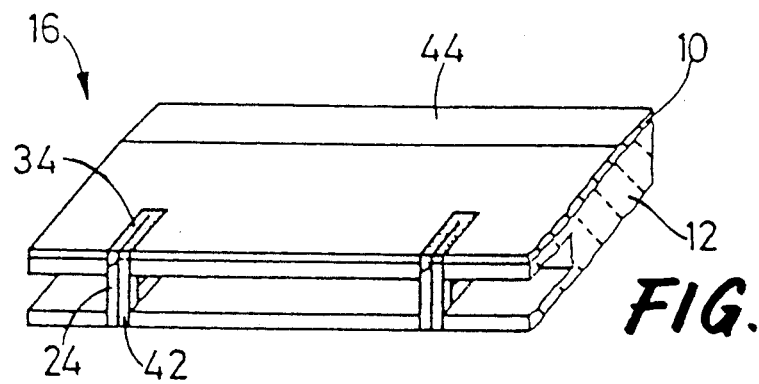
FIG. 9 is a fragmentary perspective view of the slider body blank with the core chips, after a leading ramp is formed thereon.

After the core chips 24 are fixedly accommodated in the respective chip-accommodating grooves 26 in the slider body blank 16, the major surface of the ferrite sheet 10 in which the magnetic gap 40 is open is ground to adjust the depth of the magnetic gap 40 as measured in the direction of thickness of the blank 16, as indicated in FIG. 9. At the same time, the blank 16 is machined to provide a leading ramp 44 at the rear end portion of each air bearing portion 18, which is subsequently formed on the blank 16.

Figure 10:
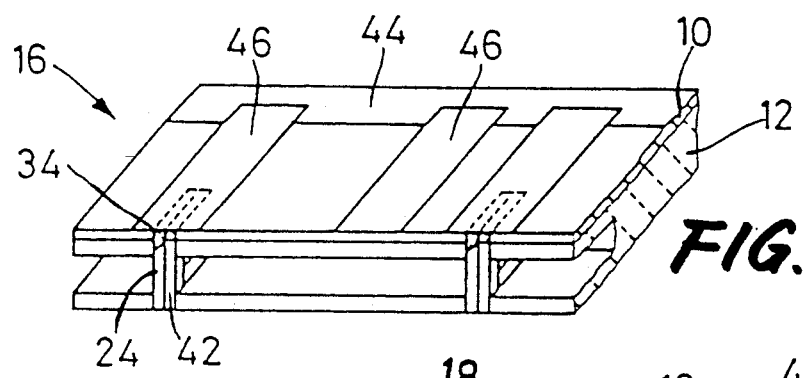
FIG. 10 is a fragmentary perspective view showing etching masks formed on the slider body blank for forming air bearing portions thereon.
Figure 11:
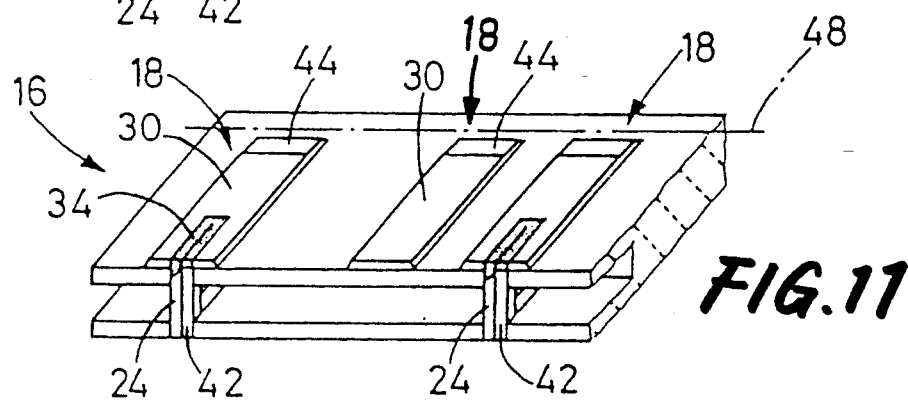
FIG. 11 is a fragmentary perspective view showing the air bearing portions formed by etching on the slider body blank.

After the slider body blank 16 is ground and machined, a pair of generally elongate rectangular etching masks 46 are formed, as shown in FIG. 10, so as to cover respective areas of the ground surface of the ferrite sheet 10, which correspond to the air bearing portions 18 of each slider body 14 [FIG. 13) obtained by cutting the blank 16 as described below. In this condition, the exposed areas of the ground surface of the ferrite sheet 10 are etched by a suitable depth, whereby there are formed the two spaced-apart parallel air bearing portions 18 for each slider body 14 (for each core slider 13), as shown in FIG. 11. The thickness of each air bearing portion 18 corresponds to the depth of etching of the ferrite sheet 10 of the blank 16.

Preferably, photolithography and chemical etching operations are used for forming the etching masks 46 and etching the ferrite sheet 10, respectively, to provide the air bearing portions 18.

Usually, the etching depth is almost the same as the thickness of the ferrite sheet 10 so that the ceramic sheet 12 is exposed at its areas corresponding to the areas of the ferrite sheet 10 which are not covered by the etching masks 46. In this case, the ferrite layers 30 are left only as the air bearing portions 18, as indicated in FIG. 11. However, a small thickness of the ferrite sheet 10 (ferrite layers 30) may be left in the areas not covered by the masks 46, provided that the ferrite material at those areas will cause substantially no magnetic flux leakage during operation of the core slider 13. To avoid a significant magnetic flux leakage, the thickness of the ferrite material left in the non-covered areas is preferably not more than about 150 μm, more preferably not more than about 100 μm.

It is noted that only one of the two air bearing portions 18 (ferrite layers 30) for each core slider 13 is aligned with the core chip 24, and the other air bearing portion 18 is disposed between the above one air bearing portion 18 of the relevant core slider 13, and one of the air bearing portions 18 for the adjacent core slider 13. Please refer to FIGS. 11 and 13.

Figure 12A:
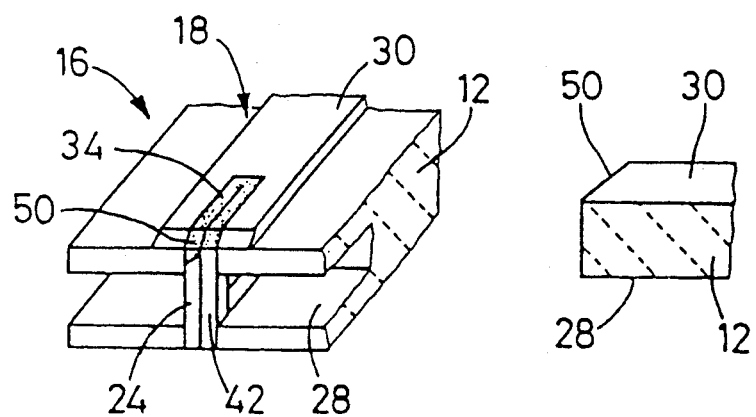
FIG. 12 (a) is a fragmentary perspective view of the slider body blank after a trailing chamfer is cut.
FIG. 12(b) is a fragmentary enlarged perspective view of the trailing chamfer.
Figure 12B:

After the air bearing portions 18 are formed by etching, the slider body blank 16 is trimmed along a cutting line 48 indicated in FIG. 11, to remove the edge portion remote from the core chips 24, so that the width of the trimmed blank 16 is equal to the length of the core slider 13 to be obtained. After or before this trimming operation, the trailing end of each air bearing portion 18 and the corresponding end of the core chip 24 are chamferred to provide a trailing chamfer 50, as shown in FIGS. 12(a) and 12(b).

After the slider body blank 16 is trimmed and chamferred, the blank 16 is cut along straight lines parallel to the direction of width of the blank, so that each core slider 13 thus obtained has the two adjacent air bearing portions 18 as provided on the blank 16, such that the two air bearing portions 18 are disposed at the opposite ends of the core slider 13 as viewed in the direction of width thereof, as indicated in FIG. 13. Then, a coil is wound on the trailing end side portion of the rectangular core chip 24, by utilizing the coil-winding groove 28 which communicates with the center cavity of the core chip 24. Thus, the core slider 13 consisting of the slider body 14 and the core chip 24 is provided with a magnetic head which has the coil and the magnetic gap 40.

According to the instant method of producing the core slider 13 for a rigid magnetic disk drive, the core chips 24 are prepared independently of the slider body blank 16 (slider body 14), and the magnetic head for writing and reading information can be considerably small-sized and compact, which is a typical feature of the so-called "composite type" core slider. In addition, since the air bearing portions 18 are constituted by the ferrite layers 30 made of Mn-Zn ferrite having a sufficiently low friction resistance, the core slider 13 permits smooth sliding of the magnetic disk on the air bearing portions 18, and assures minimum scratch of not only the magnetic disk but also the air bearing portions 18. Thus, the air bearing portions 18 have considerably improved durability. Namely, the present core slider 13 has accordingly increased life expectancy.

Further, the core slider 13 produced as described above is substantially free of magnetic flux leakage from the core chip 24, since the ferrite material exists on the slider body 14 only at the air bearing portions 18 as the ferrite layers 30, or only a small thickness of the ferrite material covers the portion of the ceramic sheet 12 between the air bearing portions 18. The magnetic flux leakage is avoided also by the bonding glass mass 34 which fills the clearance between the core chip 24 and the ferrite material. Thus, the instant core slider 13 does not suffer from the conventionally experienced deterioration of the magnetic efficiency due to the magnetic flux leakage from the core chip to the ferrite material as the air bearing portions.

The present method permits simultaneous etching of the ferrite sheet 10, for efficient formation of the air bearing portions 18 for a plurality of core sliders 13. Further, the present method permits easy grinding of the ferrite sheet 10 to simultaneously adjust the desired depth of the magnetic gap 40 for each of the two or more core sliders 13. Thus, the method assures improved production efficiency.

Figure 14:
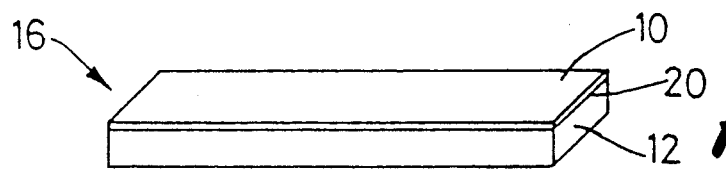
FIG. 14 is a perspective view of a slider body blank similar to that of FIG. 3, whose opposite major surfaces have been ground, and which is used to produce a core slider by a method according to another embodiment of the invention.
Figure 15:
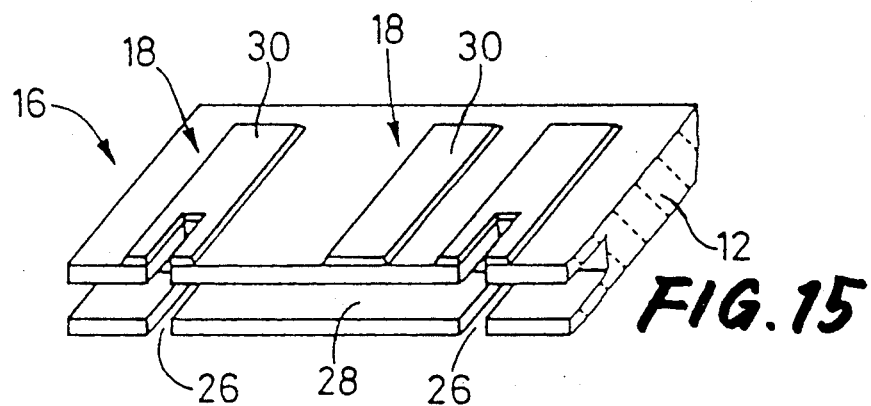
FIG. 15 is a fragmentary perspective view of the slider body blank after air bearing portions are formed by etching.

Referring next to FIGS. 14-17, there will be described another embodiment of the method of the present invention, for producing the core slider 13 which has the same construction as described above. In the present modified embodiment, the slider body blank 16 prepared in the same manner as described above with respect to the first embodiment is used. That is, the slider body blank 16 as shown in FIG. 14 is ground at the top and bottom surfaces (exposed major surfaces of the ferrite and ceramic sheets 10, 12), so that the thickness of the ferrite sheet 10 is slightly larger than the thickness of the ferrite layers 30 (air bearing portions 18) of the core slider 13 to be produced, while the thickness of the ceramic sheet 12 is equal to that of the ceramic layer 32. Subsequently, the blank 16 is subjected to an etching operation to form the air bearing portions 18, as shown in FIG. 15, in substantially the same manner as described above. Before or after this etching operation, the chip-accommodating grooves 26 and the coil-winding groove 28 are formed in the slider body blank 16, as also shown in FIG. 15. In the present embodiment, the ferrite material exists only as the air bearing portions 18.

After the air bearing portions 18 and the chip-accommodating and coil-winding grooves 26, 28 are formed, the slider body blank 16 is trimmed, along the edge portion, as described above, so as to establish the desired length of each core slider 13 to be produced. Subsequently, the slider body blank 16 is cut to provide two or more slider bodies 14 (one of which is shown in FIG. 16) each having the width corresponding to the width of the core slider 13.

Figures 16, 17:
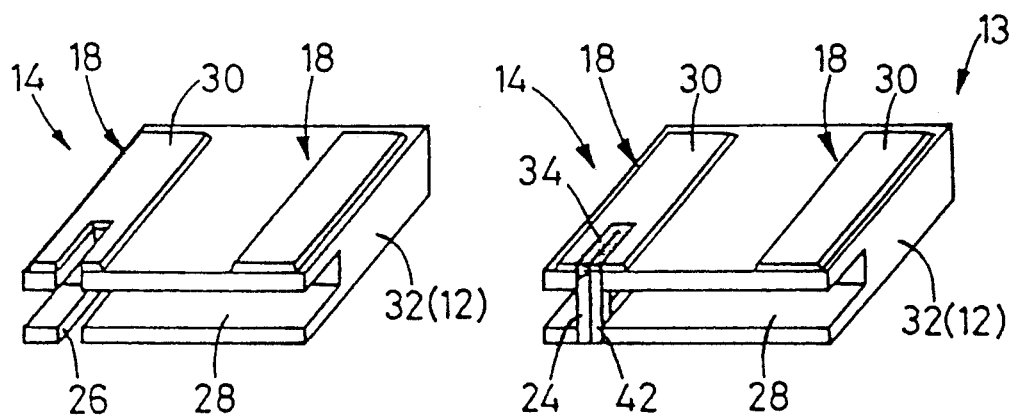
FIG. 16 is a perspective view showing a slider body obtained by cutting the slider body blank of FIG. 15.
FIG. 17 is a perspective view showing core chips secured in the slider body of FIG. 16.

In the next step, the separately prepared core chip 24 is inserted in the chip-accommodating groove 26 and bonded to the slider body 14, with the low-melting-point bonding glass mass 34, as shown in FIG. 17, in the same manner as described above with respect to the first embodiment.

After the core chip 24 is fixedly accommodated in the groove 26 in the slider body 14, the surface of the core slider 13 on the side of the air bearing portions 18 (ferrite sheet 10) is ground, so as to establish the desired depth of the magnetic gap 40 in the core chip 24. Then, the slider body 14 is machined and chamferred to provide the leading ramp and the trailing chamfer, whereby the core slider 13 is eventually produced, as shown in FIG. 17.

The core slider 13 thus produced enjoys the same advantages as the core slider produced according to the preceding embodiment. Further, the magnetic gap 40 may have a more accurately controlled depth, since the grinding operation to determine the depth of the gap 40 is effected for each core slider 13, independently of the grinding operation for another core slider. Unlike the production method according to the first embodiment, this second embodiment permits the grinding depth to be adjusted to an optimum value, so as to absorb or accommodate a variation in the position of the core chip 24 relative to the surfaces of the air bearing portions 18.

Referring further to FIGS. 18-28, there is illustrated a further embodiment of the present invention. The process steps of this embodiment are shown in FIGS. 18 through 27, while the core slider to be produced is indicated at 78 in FIG. 28.

In the present embodiment, there is prepared a generally elongate rectangular ferrite block 60 consisting of a single crystal of Mn-Zn ferrite, as indicated in FIG. 18. This ferrite block 60 has a thickness which is several times that of the ferrite sheet 10 used in the preceding embodiments. Then, a plurality of glass-filler grooves 62 are formed in the ferrite block 60, as indicated in FIG. 19, such that the grooves 62 are spaced apart from each other by a spacing distance equal to that of the chip-accommodating grooves 26 in the preceding embodiments. The formed glass-filler grooves 62 are filled with the low-melting-point bonding glass mass 34 as used in the preceding embodiments.

After the grooves 62 are filled with the glass mass 34, the ferrite block 60 is sliced into a plurality of ferrite sheets 66 each having the same thickness as the ferrite sheet 10. One of these ferrite sheets 66 is shown in FIG. 20(a). The opposite major surfaces of each ferrite sheet 66 are ground, and one of the ground surfaces is mirror-polished.

In the meantime, there is prepared a ceramic sheet 68 which is made of the same non-magnetic material and has the same thickness and cross sectional area as the ceramic sheet 12 used in the preceding embodiments. This ceramic sheet 68, which is shown in FIG. 20(b), is ground at the opposite major surfaces, and is mirror-polished at one of the ground surfaces, like the ferrite sheet 66.

Figure 22:
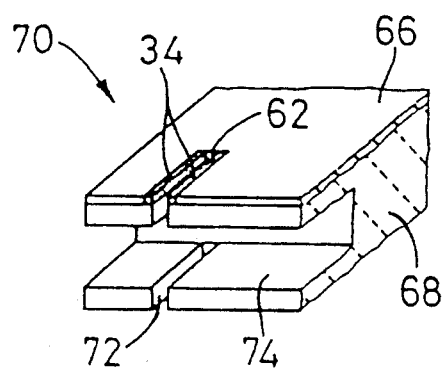
FIG. 22 is a fragmentary perspective view showing the slider body blank having a chip-accommodating groove and a coil-winding groove formed therein.

The thus prepared ferrite sheet 66 and the ceramic sheet 68 are bonded together at the mirror-polished surfaces, with the bonding glass layer 20, whereby a slider body blank 70 is prepared as indicated in FIG. 21. In the thus prepared slider body blank 70, there are formed chip-accommodating grooves 72 and a coil-winding groove 74, as shown in FIG. 22.

Each chip-accommodating groove 72 is formed through the bonding glass mass 34 filling the glass-filler groove 62. More specifically, a portion of the bonding glass mass 34 is left on the opposite surfaces of the groove 62 such that the remaining portion of the glass mass 34 defines the chip-accommodating groove 72 aligned with the centerline of the groove 62, as indicated in FIG. 22. Namely, the width of the chip-accommodating groove 72 is smaller than that of the glass-filler groove 62.

After the grooves 72, 74 are formed in the slider body blank 70, a core chip 76 having a magnetic gap 40 is inserted into the appropriate chip-accommodating groove 72. In this condition, the slider body blank 70 is heated to soften the remaining bonding glass mass 34, to thereby bond the chip 76 to the blank 70, as shown in FIG. 23.

Figure 24:
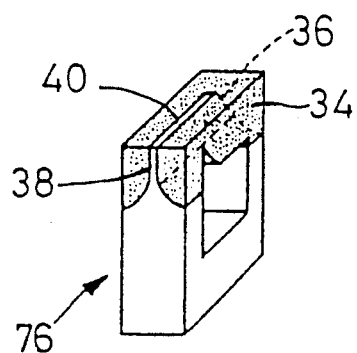
FIG. 24 is a perspective view of the core chip of FIG. 23.

As shown in FIG. 24, the core chip 76 used in this third embodiment is more or less similar to the core chip 24 of the preceding embodiments, but is different from the core chip 24 in that the narrow portion 38 is formed in the middle of the thickness of the chip 76. Further, the masses of the bonding glass 34 are deposited on the chip 76 such that the narrow portion 36 is embedded in the bonding glass 34.

Figure 23:
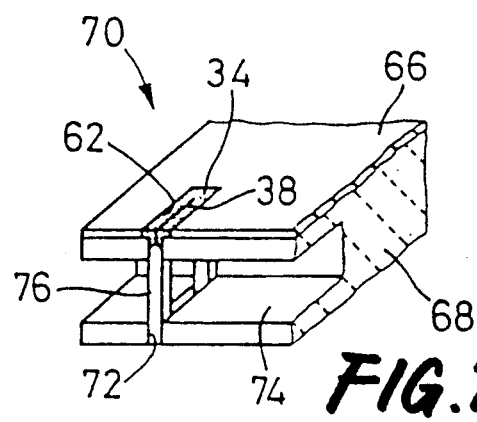
FIG. 23 is a fragmentary perspective view showing a core chip secured in the slider body blank of FIG. 22.

For bonding the core chip 76 to the slider body blank 70, the core chip 76 is first positioned in the chip-accommodating groove 72, and the bonding glass 34 is then softened at an elevated temperature, so that the core chip 76 is integrally bonded to the blank 70 with the glass 34, as shown in FIG. 23, like the core chip 24 in the preceding embodiments.

Figure 25:
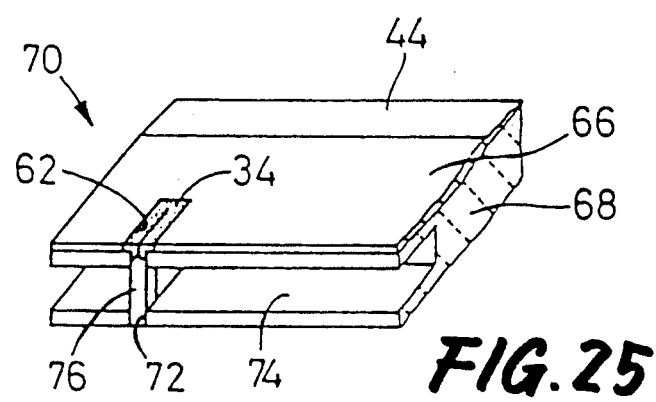
FIG. 25 is a fragmentary perspective view of the slider body blank after a leading ramp is formed thereon.
Figure 26:
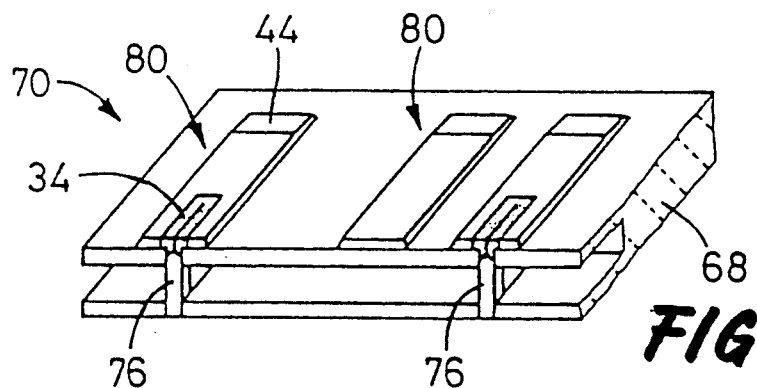
FIG. 26 is a fragmentary perspective view showing air bearing portions formed on the slider body blank of FIG. 25.
Figure 27:
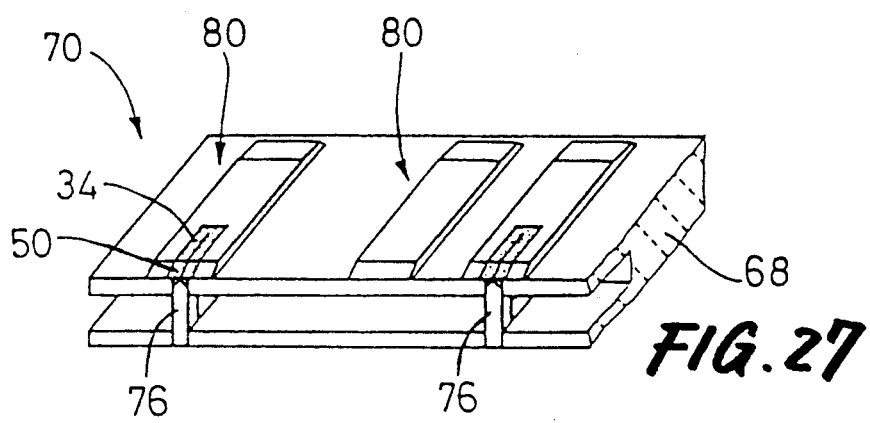
FIG. 27 is a fragmentary perspective view showing the slider body blank after it is machined to a desired width and chamferred to provide a trailing chamfer.
Figure 28:
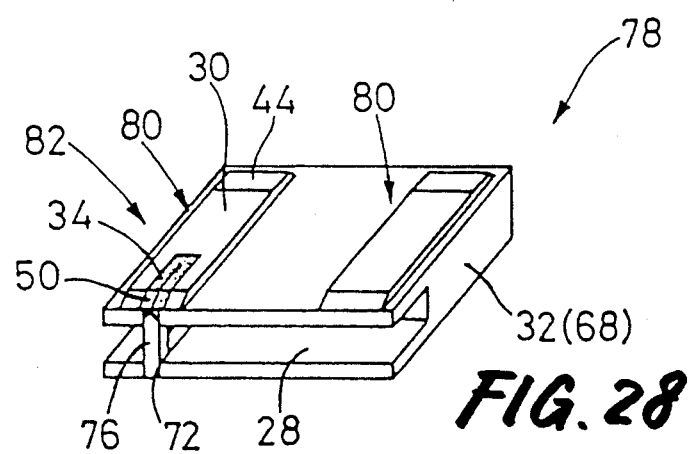
FIG. 28 is a perspective view of a core slider produced by the method illustrated in FIGS. 18 through 27.

As in the preceding embodiments, the surface of the blank 70 in which the magnetic gap 40 of the core chip 76 is open is ground, so as to establish the desired depth of the magnetic gap 40, and the blank 76 is machined to provide the leading ramp 44 at the leading end portion of each air bearing portion 80 on a core slider 78 to be produced (FIG. 28), as shown in FIG. 25. Then, the ferrite sheet 66 of the blank 70 is etched to form the air bearing portions 80, as shown in FIG. 26, in the same manner as in the preceding embodiments. Subsequently, the blank 70 is trimmed to determine the length of the core slider 78, and chamferred to provide the trailing chamfer, as indicated in FIG. 27. Then, the blank 70 is cut to provide the core slider 78 which consists of the core chip 76, and a slider body 82 having the desired width.

In the present embodiment, too, the thickness of the ferrite layers 30 constituting the air bearing portions 80 is preferably not more than 150 $\mu$m, and more preferably not more than 100 $\mu$m, in order to effectively avoid the magnetic flux leakage from the core chip 76.

Like the core slider 13 produced according to the first and second embodiments, the core slider 78 produced by the instant third embodiment assures smooth sliding of a magnetic disk (as a data storage medium) on the air bearing portions 80, which are constituted by the Mn-Zn ferrite layers 30 having a low sliding resistance. Thus, the core slider 78 and the magnetic head including this core slider 78 have considerably increased life expectancy. Further, since the ferrite layers 30 have an extremely small thickness, and are isolated by the bonding glass 34 from the core chip 76, the instant core slider 78 is substantially free of the deterioration of the magnetic efficiency due to the magnetic flux leakage from the core chip 76.

The present embodiment is advantageous over the preceding embodiments, since the spacer 42 is not necessary for bonding the core chip 76 to the slider body blank 70.

While the present invention has been described in its presently preferred embodiments, it is to be understood that the invention is not limited to the details of the illustrated embodiments, but may be embodied with various changes, modifications and improvements, which may occur to those skilled in the art, without departing from the spirit of the invention which is understood from the foregoing description.

For instance, the air bearing portions 18, 80 may be formed by machining the slider body blank 16, 70, rather than by etching the blank 16, 70 as in the illustrated embodiments. In this case, the ferrite sheet 10, 66 may consist of a poly-crystalline Mn-Zn ferrite, and the air bearing portions 18, 80 may be formed by machining either before the blank 16, 70 is ground to define the depth of the magnetic gap 40, or after the blank 16, 70 is ground for the same purpose.

In the illustrated embodiments, the core slider 13, 78 has the core chip 24, 76 which is aligned with the centerline of one of the two air bearing portions 18, 80. The core chip 24, 76 may be bonded to the slider body 14, 82, at a position intermediate between the two air bearing portions 18, 80 as seen in the direction perpendicular to the direction of extension of the air bearing portions.

What is claimed is:

1. A core slider for a rigid magnetic disk drive, including a slider body having air bearing portions, and a core chip which has a magnetic gap for writing and reading information and which is integrally secured to said slider body, wherein the improvement comprises:
   at least a part of said air bearing portion being formed of Mn-Zn ferrite, and the balance of said slider body being substantially a non-magnetic ceramic material;
   said slider body having a chip-accommodating groove disposed at least partially within one of said air bearing portions; and
   said core chip being accommodated in said chip-accommodating groove and being bonded by a glass material to said slider body, such that said core chip is insulated from said Mn-Zn ferrite to substantially prevent magnetic flux leakage.

2. The core slider of claim 1, wherein said Mn-Zn ferrite is a single crystal.

3. The core slider of claim 1, wherein said non-magnetic ceramic material includes $CaTiO_3$ as a major component thereof.

4. The core slider of claim 1, wherein said Mn-Zn ferrite has a thickness of not more than 150 $\mu$m.

5. The core slider of claim 1, wherein said core chip has a narrow portion which extends in a direction of extension of said air bearing portions and which has said magnetic gap, a dimension of said narrow portion in a direction perpendicular to said direction of extension of said air bearing portions being smaller than a dimension of said chip-accommodating groove in said direction of extension.

6. The core slider of claim 5, wherein said glass material fills a space around said narrow portion of said core chip in said chip-accommodating groove.

7. The core slider of claim 1, wherein said air bearing portions are entirely formed of said Mn-Zn ferrite.

* * * * *